US010970221B2

(12) United States Patent
Armangau et al.

(10) Patent No.: US 10,970,221 B2
(45) Date of Patent: Apr. 6, 2021

(54) OPTIMIZING SPACE UTILIZATION BY RETAINING METADATA IN CACHE (71) Applicant: EMC IP Holding Company LLC, Hopkinton, MA (US)

(72) Inventors: Philippe Armangau, Acton, MA (US); Monica Chaudhary, South Grafton, MA (US); Ajay Karri, South Grafton, MA (US); Alexander Daniel, Westford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 9 days.

(21) Appl. No.: 16/398,670

(22) Filed: Apr. 30, 2019

(65) Prior Publication Data

US 2020/0349082 A1 Nov. 5, 2020

(51) Int. Cl.
*G06F 12/08* (2016.01)
*G06F 12/0871* (2016.01)
*G06F 3/06* (2006.01)

(52) U.S. Cl.
CPC .......... *G06F 12/0871* (2013.01); *G06F 3/064* (2013.01); *G06F 3/0685* (2013.01); *G06F 3/0604* (2013.01)

(58) Field of Classification Search
CPC .... G06F 12/0871; G06F 3/0685; G06F 3/064; G06F 3/0604
See application file for complete search history.

(56) References Cited

U.S. PATENT DOCUMENTS

| 9,779,023 | B1 | 10/2017 | Armangau et al. | |
|---|---|---|---|---|
| 9,880,743 | B1 | 1/2018 | Armangau et al. | |
| 9,959,049 | B1 | 5/2018 | Armangau | |
| 9,985,649 | B1 | 5/2018 | Bassov et al. | |
| 10,203,880 | B1 | 2/2019 | Armangau et al. | |
| 2015/0106557 | A1* | 4/2015 | Yu ....................... | G11C 11/5678 711/103 |
| 2015/0169465 | A1* | 6/2015 | Slepon .................. | G06F 3/0659 711/103 |

(Continued)

OTHER PUBLICATIONS

Armangau, Philippe, et al.; "Relocating Compressed Extents Using Batch-Hole List," U.S. Appl. No. 16/176,738, filed Oct. 31, 2018.

(Continued)

*Primary Examiner* — Hiep T Nguyen
(74) *Attorney, Agent, or Firm* — BainwoodHuang (57) ABSTRACT

A technique for managing data received into a cache operates in cycles. To process a current batch of compressed blocks during a current cache processing cycle, a storage system obtains a new mapping structure and a new segment of contiguous storage space. If the system can place some of the current batch of compressed blocks into previously-allocated space, the system does so and partially populates the new mapping structure with entries for mapping the other compressed blocks that were not placed. The system then asserts a hold on the new mapping structure, so that the mapping structure is retained in cache at the end of the current cache processing cycle, and more completely populates the new mapping structure with entries for other compressed blocks during a later cache processing cycle before releasing the hold.

20 Claims, 5 Drawing Sheets

(56) References Cited

U.S. PATENT DOCUMENTS

2018/0329631 A1    11/2018  Swift

OTHER PUBLICATIONS

Armangau, Philippe, et al.; "Adaptively Over-Allocating Storage Space for Compressed Data," U.S. Appl. No. 16/262,423, filed Jan. 30, 2019.
Armangau, Philippe, et al.; "Overwriting Compressed Data Extents," U.S. Appl. No. 15/499,206, filed Apr. 27, 2017.
Kuang, Yaming, et al.; "Recovering Compressed Data to Reduce Data Loss," U.S. Appl. No. 15/395,968, filed Dec. 30, 2016.

* cited by examiner

OPTIMIZING SPACE UTILIZATION BY RETAINING METADATA IN CACHE

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some storage systems perform compression on newly arriving host data. For example, a storage system may receive incoming host data into a cache, arrange the data in blocks, and compress the blocks prior to storing them in persistent structures. One current approach stores compressed data in segments and provides mapping structures as indices into the segments. For example, each segment includes multiple physical blocks of contiguous storage space, which may be treated as one continuous space. Compressed blocks are packed into each segment, and associated mapping structures are provided to track locations of the compressed blocks within each segment. The mapping structures may form part of a data path that the data storage system uses for accessing the compressed data. According to some examples, the mapping structures are uniformly sized, with each mapping structure having space for indexing a fixed number of compressed blocks, such as twelve. The sizes of segments may be allowed to vary, with larger segments allocated for less compressible data and smaller segments allocated for more compressible data. When newly-arriving host data specify overwrites, i.e., blocks directed to addresses that already store data, the storage system may attempt to overwrite the data in place, e.g., by replacing the compressed data at the addressed locations with the new data.

SUMMARY

Unfortunately, compressed data written during overwrites do not always fit into spaces that were allocated earlier for previous versions of the same data. For example, the new data may not be as compressible as was the previous data. As a result, a storage system may have to find some other locations at which to place the new data.

In some cases, a data storage system may succeed in finding existing locations for some of the new data but not for all of it. For example, the data storage system may obtain a batch of blocks (e.g., twelve blocks) of new data, where at least some of the blocks specify overwrites. The storage system may succeed in finding existing locations for seven of the new blocks but may need to allocate new space for the remaining five. As a result, a mapping structure allocated for mapping the current batch may be incompletely filled, containing five rather than twelve indices. Although this may appear to be a minor concern, the effect can be large when multiplied over large numbers of mapping structures. For example, it is generally most efficient to keep mapping structures in cache. If mapping structures are largely empty, however, cache efficiency drops and system performance degrades.

In contrast with prior approaches, an improved technique for managing data received into a cache operates in cache processing cycles. To process a current batch of compressed blocks during a current cache processing cycle, a storage system obtains a new mapping structure, which has space for mapping a predetermined number of compressed blocks, and obtains a new segment of contiguous storage space. If the system manages to place some of the current batch of compressed blocks into previously-allocated space, the system does so and partially populates the new mapping structure with entries for mapping the remaining compressed blocks, which were not placed in the previously-allocated space. The system then places a hold on the new mapping structure, so that the mapping structure is retained in the cache at the end of the current cache processing cycle, and more completely populates the new mapping structure with entries for other compressed blocks during a later cache processing cycle. With the mapping structure more completely filled, the system releases the hold on the new mapping structure. Advantageously, the improved technique enables mapping structures to be populated more fully and thus promotes efficient cache utilization.

Certain embodiments are directed to a method of managing data received for writing. The method includes, during a first cache processing cycle, (i) placing M compressed blocks of the data in a segment of storage space, (ii) populating M entries of a mapping structure in cache for mapping the M compressed blocks in the segment, the mapping structure having space for N entries, N>M, with N−M locations of the mapping structure remaining unpopulated, and (iii), applying a hold to the mapping structure in the cache to ensure that the mapping structure is retained in the cache. During a second cache processing cycle, the method includes (i) placing between 1 and N−M additional compressed blocks in the segment and (ii) populating an additional location in the mapping structure for each additional compressed block placed or to be placed in the segment. During or after the second cache processing cycle, the method further includes releasing the hold on the mapping structure.

Other embodiments are directed to a computerized apparatus constructed and arranged to perform a method of managing data received for writing, such as the method described above. Still other embodiments are directed to a computer program product. The computer program product stores instructions which, when executed on control circuitry of a computerized apparatus, cause the computerized apparatus to perform a method of managing data received for writing, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. One should appreciate that such embodiments are provided by way of example to illustrate certain features and principles of the invention but that the invention hereof is not limited to the particular embodiments described.

An improved technique for managing data received into a cache operates in cycles. To process a current batch of compressed blocks during a current cache processing cycle, a storage system obtains a new mapping structure and a new segment of contiguous storage space. If the system can place some of the current batch of compressed blocks into previously-allocated space, the system does so and partially populates the new mapping structure with entries for mapping the other compressed blocks that were not placed. The system then asserts a hold on the new mapping structure, so that the mapping structure is retained in cache at the end of the current cache processing cycle, and more completely populates the new mapping structure with entries for other compressed blocks during a later cache processing cycle before releasing the hold.

Figure 1:
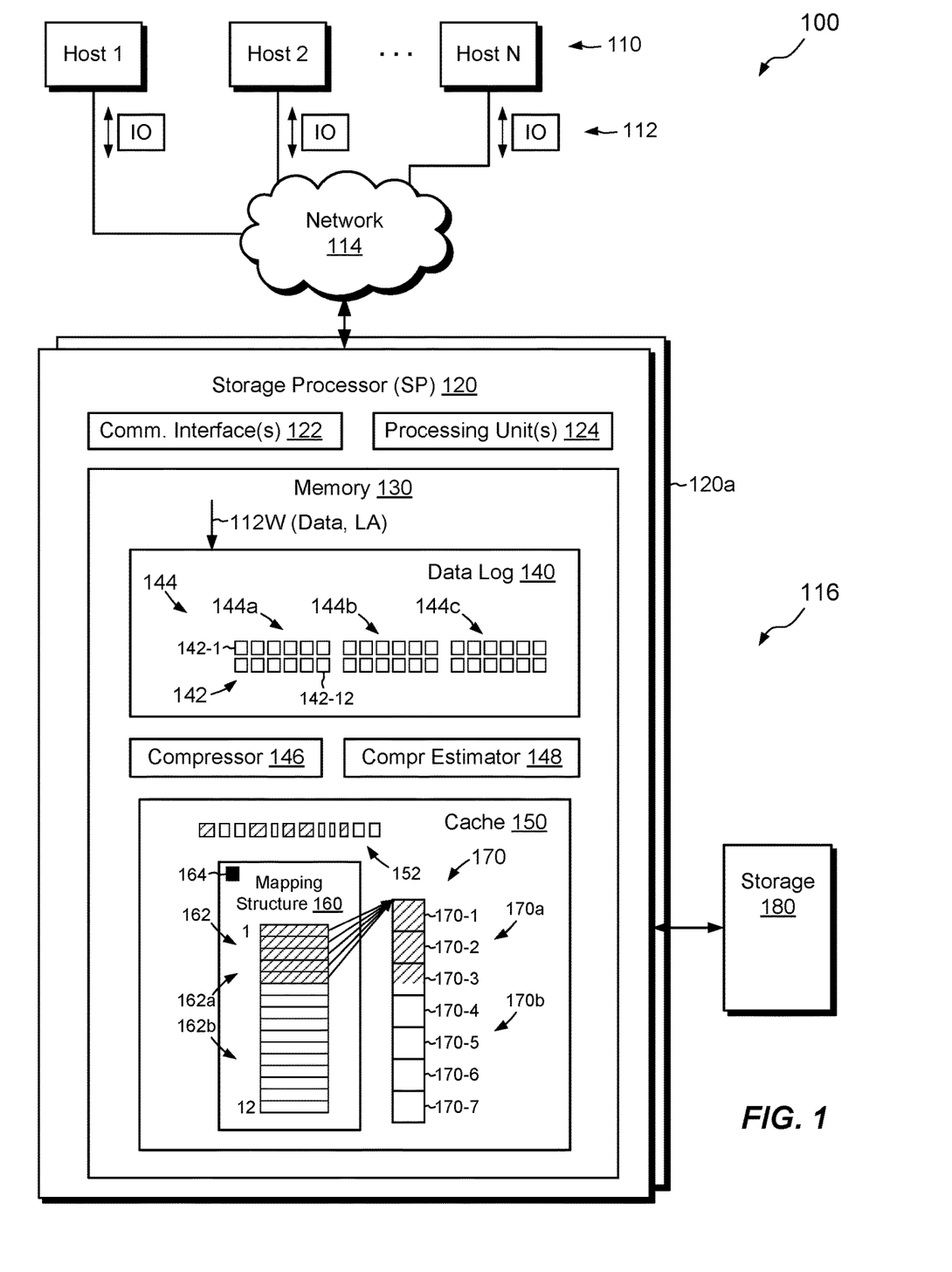
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 180, such as magnetic disk drives, electronic flash drives, optical drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 180.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a data log 140, a data compressor 146, a compression estimator 148, and a cache 150. The data log 140 is configured to receive data in writes 112W from hosts 110 and to arrange the host data in blocks 142, which the data log 140 further arranges into batches 144. Each batch 144 (e.g., batches 144a, 144b, 144c, and so on) may include a uniform number of blocks, such as twelve blocks, e.g., blocks 142-1 through 142-12. In an example, the data log 140 is implemented using battery-backed DRAM (Dynamic Random Access Memory), which may be mirrored to DRAM on a second SP, e.g., SP 120a, such that host data may be deemed persisted once written to the data log 140 and mirrored. Any data-log arrangement may be used, however, and certain embodiments do not require a data log.

Compressor 146 is configured to compress blocks 142 of data to produce compressed blocks 152. Compressor 146 may be implemented in hardware, e.g., as a special-purpose compression chip, in software, e.g., using a selected lossless compression algorithm, in firmware, or in any combination of hardware, software, and/or firmware.

Compression estimator 148 is configured to estimate compressed sizes of blocks 142 based on a history of block compression using the compressor 146. For example, compression estimator 148 is configured to calculate a mean or median compression ratio previously achieved by compressor 146. Examples of compression estimation may be found in copending U.S. application Ser. No. 16/262,423, filed Jan. 30, 2019, the contents and teachings of which are incorporated herein by reference in their entirety. In an example, blocks 142 have uniform size, such as 4 kB or 8 kB, such that an estimated compression ratio directly implies a compressed block size, and vice-versa. One should appreciate that estimation of compression ratio or compressed block size based on history is an optimization but is not required by some embodiments.

Cache 150 may be realized in DRAM, such as the mirrored DRAM mentioned above, or in any other memory, which is preferably high-speed memory. In an example, cache 150 includes block-sized pages (e.g., 4-kB or 8-kB pages) and is configured to store mapping structures and segments, such as mapping structure 160 and segment 170. Mapping structure 160 is metadata that is used to map compressed blocks. For example, mapping structure 160 may be part of a data path that the SP 120 traverses for accessing compressed blocks. The overall data path may include, for example, an inode that points to a series of indirect blocks, terminating in one or more leaf indirect blocks (an arrangement commonly found in Linux-based file systems). Here, however, the leaf indirect blocks include pointers that point to mapping structures, which point to compressed data. Non-limiting examples of mapping structure 160 include virtual block maps (VBMs), such as those described in the incorporated application.

Segment 170 includes a range of contiguous storage space. In an example, data objects realized in the data storage system 116, such as LUNs (Logical UNits), file systems, and/or virtual machine disks, are backed by an underlying file system or volume (not shown) that is denominated in blocks. In the illustrated example, segment 170 is composed of multiple such blocks, i.e., blocks 170-1 through 170-7, and each of these blocks has the same size as blocks 142. Identical sizes are not required, however. Also, although segment 170 includes seven blocks, this is merely an example, as the sizes of segments may vary based on the number of compressed blocks indexed by the associated mapping structure 160 and compressibility of the data. For purposes of storing compressed data, the SP 120 may ignore block boundaries and treat the segment 170 as one continuous space, into which compressed data may be packed.

In an example, mapping structures are provided as fixed-size data structures that each have space for N entries (indices) 162, where N is the number of blocks 152 in a batch 144, e.g., twelve. Each of the indices 162 is configured to provide mapping information about a respective compressed block, such as the following:

A starting position (offset) of that compressed block relative to the beginning of the segment 170;
A length of the compressed block, e.g., in sectors;
A logical address at which the compressed block has been written, e.g., the address within a file, volume, etc.; and
A reference count, e.g., the number of leaf indirect block pointers that point to it.

These constituents enable the SP 120 to quickly locate compressed blocks based on logical addresses using the indices 162. They also support block-based deduplication, as they provide block virtualization between block pointers in leaf indirect blocks and the compressed data to which they point.

In example operation, hosts 110 issue I/O requests 112 to the data storage system 116. SP 120 receives the I/O requests 112 at the communication interfaces 122 and initiates further processing. Some of the I/O requests are write requests 112W, some of which may specify overwrites and others of which may specify allocating writes. An "overwrite" as used herein is a write of data to a location at which data already resides. Each overwrite is therefore an update to an existing, already-written block. An "allocating write" is a write of data that was not previously mapped and written.

Data log 142 ingests incoming writes 112W arriving from hosts 110, holding the specified data temporarily until it can be placed in persistent structures in storage 180. The data log 140 arranges the data in blocks 142 and arranges the blocks 142 in batches 144. Each batch 144 includes a total of N blocks 142.

Compressor 146 obtains a current batch from the data log 140, such as batch 144a, and compresses each of the blocks 142-1 through 142-12 in that batch 144a. Such compression produces compressed blocks 152, i.e., one compressed block 152 for each of the blocks 142-1 through 142-12.

Some or all of the compressed blocks 152 in the current batch 144a may represent overwrites, and SP 120 may attempt to perform each overwrite in place, e.g., by testing whether the compressed block fits into the space currently occupied by the previous version of compressed data at the same logical address. For example, the previous version may reside in another segment (not shown) mapped by another mapping structure (not shown). If the new data fits into the previously-occupied space, the SP 120 may perform the overwrite in place, avoiding having to allocate new space for the new data or having to adjust any mapping pointers. If the new data does not fit, however, the SP 120 may look for other open spaces, i.e., "holes," where previously mapped data has been deleted. Writes into these holes would not be overwrites in place, but they would avoid having to allocate new storage space. If the SP 120 is unsuccessful in performing either an overwrite in place or a hole-fill, the SP 120 may mark the compressed block for new allocation. In the example shown, a total of M (e.g., five) hatched blocks among compressed blocks 152 require new allocations, whereas N–M (e.g., seven) unhatched blocks do not, as they can be successfully overwritten in place or hole-filled. The M blocks that require allocation may be overwrites or allocating writes.

In an example, the SP 120 starts a new cache processing cycle, obtaining the M hatched blocks from the current batch 144a and allocating a new mapping structure (mapping structure 160) for mapping the M compressed blocks. SP 120 also allocates a new segment (segment 170) for storing the M compressed blocks. The SP 120 then populates an index 162 for each of the M compressed blocks, e.g., by providing its offset, length, logical address, etc., for each of these blocks. Once the indices 162 have been populated, the indices may be regarded as including a first set of indices 162a, which are populated, and a second set of indices 162b, which are empty.

Given that the mapping structure 160 has a fixed length, which may be big enough to accommodate N compressed blocks, it is clear that the mapping structure 160 is underutilized. Only five of its twelve indices have been populated. If the cache 150 were allowed to overwrite or flush the page containing the mapping structure 160 at the conclusion of the current cache cycle, the cache 150 would fix in place the underutilized mapping structure 160, undermining overall efficiency of the cache 150.

To avoid this undesirable outcome, the cache 150 sets a flag or other indicator 154 as a signal to the cache 150 to hold or pin the mapping structure 160 at the end of the current cache processing cycle, i.e., not to overwrite or flush it. In some examples, the indicator 154 also signals the cache 150 to hold the associated segment 170. Applying the hold allows the mapping structure 160 to remain in cache 150 longer so that it has an opportunity to be further filled during a subsequent cache processing cycle. Once the mapping structure 160 has been more fully populated with indices, e.g., during the next or some later cache processing cycle, the SP 120 may reset the indicator 164 so that the cache 150 is allowed to flush the mapping structure 160 at the conclusion of its then current cycle. The flushing as described herein is to any lower-level structure, such as a file system, volume, disk, disk group, or the like.

In some examples, the SP 120 performs additional acts to promote efficiency. For example, when allocating the segment 170 during the current cache cycle, the SP 120 may establish the size of the segment 170 based on both (i) the collective compressed size of the M compressed blocks to be placed in the segment 170 for the current cycle and (ii) an estimated size, as provided by estimator 148, of N–M compressed blocks that may be placed later. In the illustrated example, only portion 170a (hatched) is used for storing the M compressed blocks, whereas portion 170b (unhatched) provides a margin that reserves space for compressed blocks to be processed later. Rather than establishing the size of segment 170 as only three blocks long, which is all that would be needed for the M compressed blocks, the SP 120 instead establishes the size of segment 170 as seven blocks long, which leaves room for N–M compressed blocks that may be placed later. One should appreciate that the size of segment 170 may vary for different batches 144, depending on the different compressibility of the particular data and on changes in the average or median compressibility as determined by the compression estimator 148.

In some examples, SP 120 processes a new batch 144 on each processing cycle of the cache 150, allocating a new mapping structure and segment as needed and overwriting or flushing only mapping structures that are not marked as held. In some examples, SP 120 uses multiple computing threads for cache processing. Each thread acts as a worker to process a respective batch 144 from the data log 140. Such threads may be operated in parallel or in any other suitable manner. Each computing thread may operate one cache processing cycle after another, independently of cache processing cycles operated by other threads. Cache processing cycles among different threads need not be synchronized.

Figure 2:
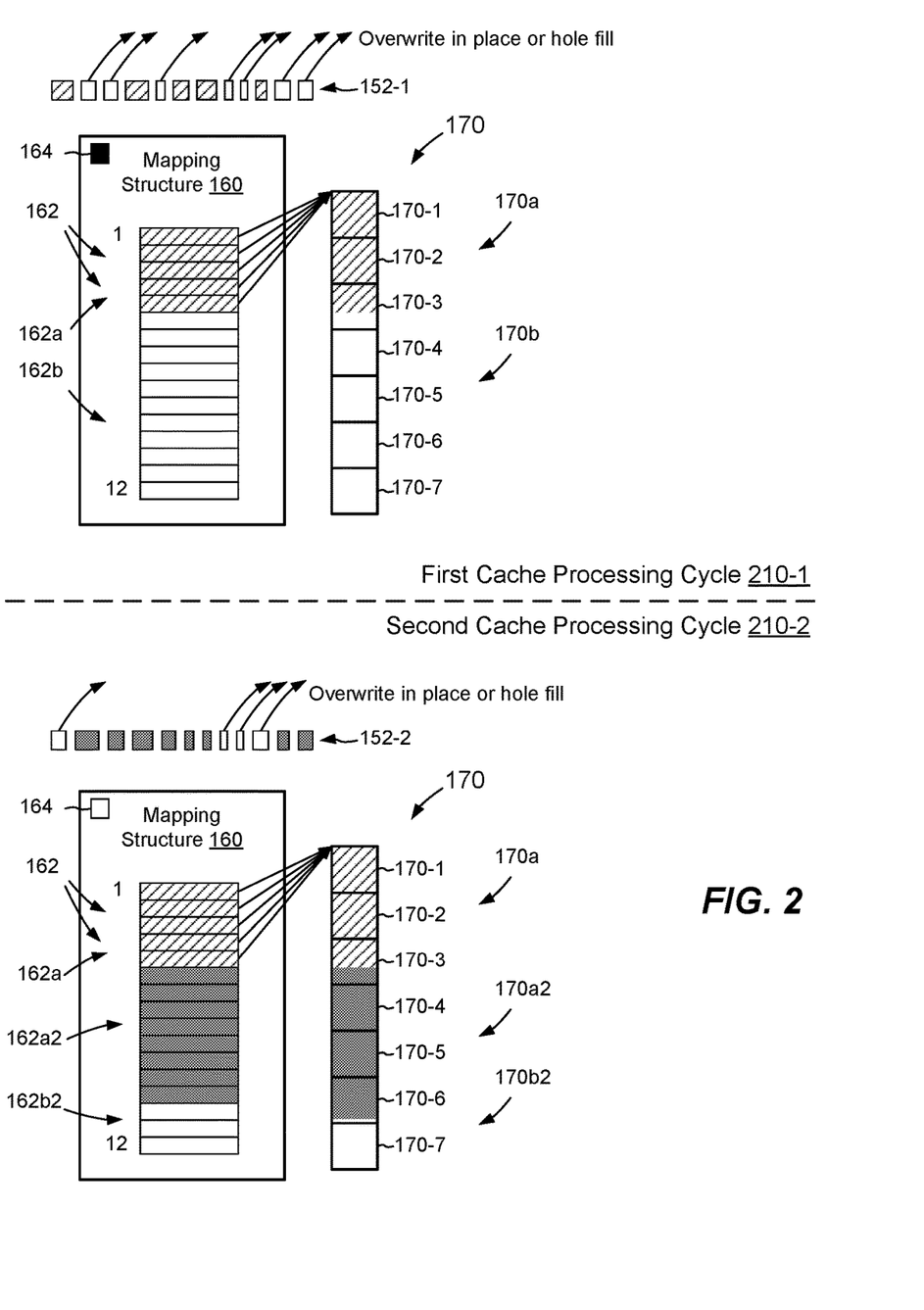
FIG. 2 is a diagram showing a mapping metadata structure of FIG. 1 during two different cache cycles.

FIG. 2 shows certain operations of FIG. 1 in additional detail. The top of FIG. 2 shows the mapping structure 160 and segment 170 during a first cache processing cycle 210-1 and is identical to the depiction shown in FIG. 1, with the indicator 164 set to ensure that mapping structure 160 is not overwritten or flushed at the end of the first cycle 210-1. Here, compressed blocks 152 are labeled 152-1, to match the convention for identifying the first cycle 210-1. The bottom of FIG. 2 shows the same structures during a second cache processing cycle 210-2, which may immediately follow the first cache processing cycle 210-1 or occur sometime later.

As shown at the bottom of FIG. 2, an additional batch has been obtained from the data log 140, such as batch 144b (FIG. 1), and the blocks of batch 144b have been compressed, yielding compressed blocks 152-2. In this batch 144b, we assume that only four compressed blocks can be overwritten in place or hole-filled, leaving eight blocks still to be placed. Rather than creating indices for these eight blocks in a new mapping structure, SP 120 instead places the indices in the mapping structure 160, i.e., the one that was partially filled during the first cache processing cycle 210-1. For example, SP 120 may populate indices 162a2, leaving only indices 162b2 empty. SP 120 may also place the compressed blocks themselves in the segment 170 (e.g., in region 170a2; solid shading), adjacent to the previously placed data, leaving only region 170b2 empty. At the end of the second cache processing cycle 210-2, both the mapping structure 160 and the segment 170 are more completely filled. If the level of fullness is deemed sufficient, e.g., if it exceeds a predetermined threshold, then the indicator 164 for mapping structure 160 may be cleared, releasing the hold and allowing the mapping structure 160 to be overwritten or flushed at the end of the second cache processing cycle 210-2. If the level of fullness is not deemed sufficient, however, the indicator 164 may be left unchanged, such that the mapping structure 160 can remain available in cache 150 even longer, allowing it to be even more completely filled.

Figure 3:
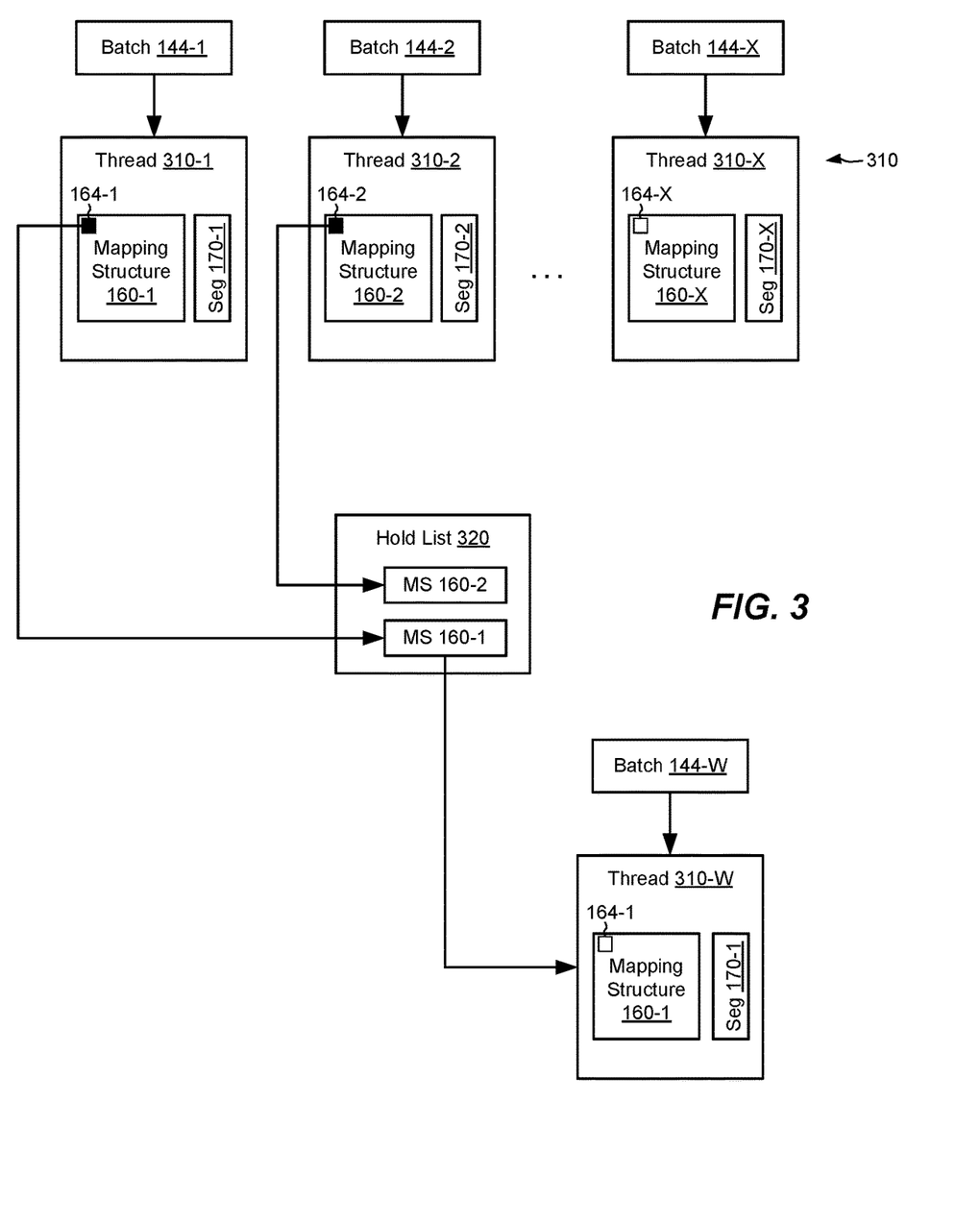
FIG. 3 is a block diagram showing multiple threads that process respective batches of blocks and employ a hold list to identify mapping structures on which holds have been placed.

FIG. 3 shows an example arrangement for multi-threaded processing of batches 144 in the data log 140. Here, multiple computing threads 310-1 through 310-X process respective batches 144-1 through 144-X. "X" may be arbitrarily large. Threads 310 each obtain respective mapping structures, 160-1 through 160-X. The mapping structures have respective indicators 164-1 through 164-X, and point to respective segments 170-1 through 170-X. In accordance with improvements hereof, SP 120 places mapping structures 160 on a hold list 320 in response to indicators 164 on the mapping structures 160 being set. The hold list 320 thus accumulates a list of mapping structures 160 that are held in cache 160 and thus have available indices 162 that may be filled during current cache cycles operated by the threads 310.

For example, one of the threads 310W, when processing a batch 144W, may require space for placing a compressed block pursuant to an overwrite. As each mapping structure 160 on the hold list 320 has unfilled indices, each such mapping structure is also associated with a segment 170 that has free space, i.e., holes. These holes may be available for hole-fill operations by any of the threads 310. Thus, any thread that requires a hole for hole-filling compressed blocks of a current batch can look to the hold list 320 and locate a hole pointed to by the listed mapping structure. Each mapping structure on the hold list 320 may be identified in any suitable way, such as by an identifier, address, or segment referenced by the mapping structure. Once a mapping structure 160 has been adequately filled, its indicator 164 may be reset, allowing the mapping structure 160 to be overwritten or flushed at the conclusion of the current cache cycle by the respective thread (e.g., the thread that allocated the mapping structure). When resetting the indicator 164 on a mapping structure 160, SP 120 also removes that mapping structure from the hold list 320.

Figure 4:
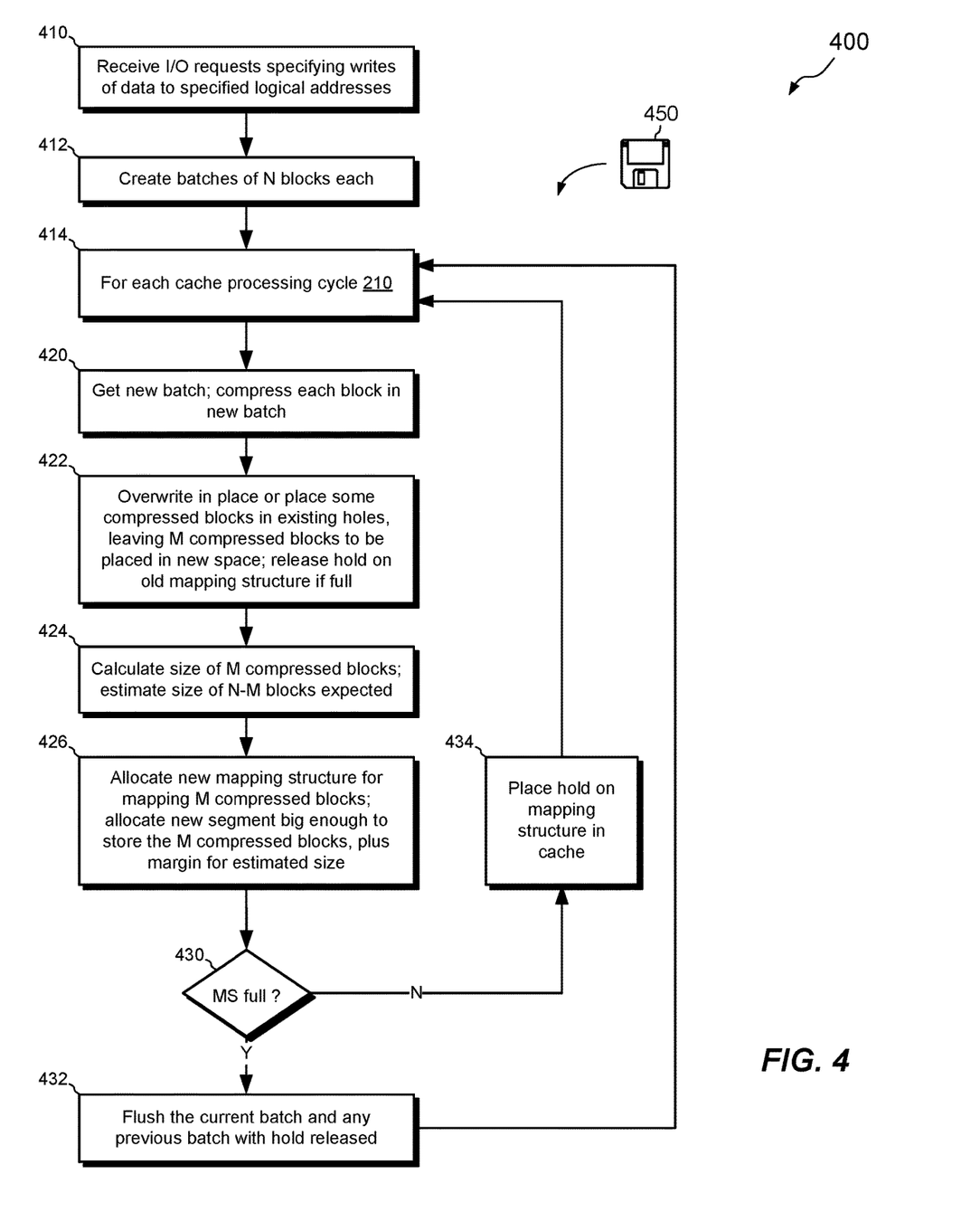
FIGS. 4 and 5 are flowcharts showing example methods for managing writes.
Figure 5:
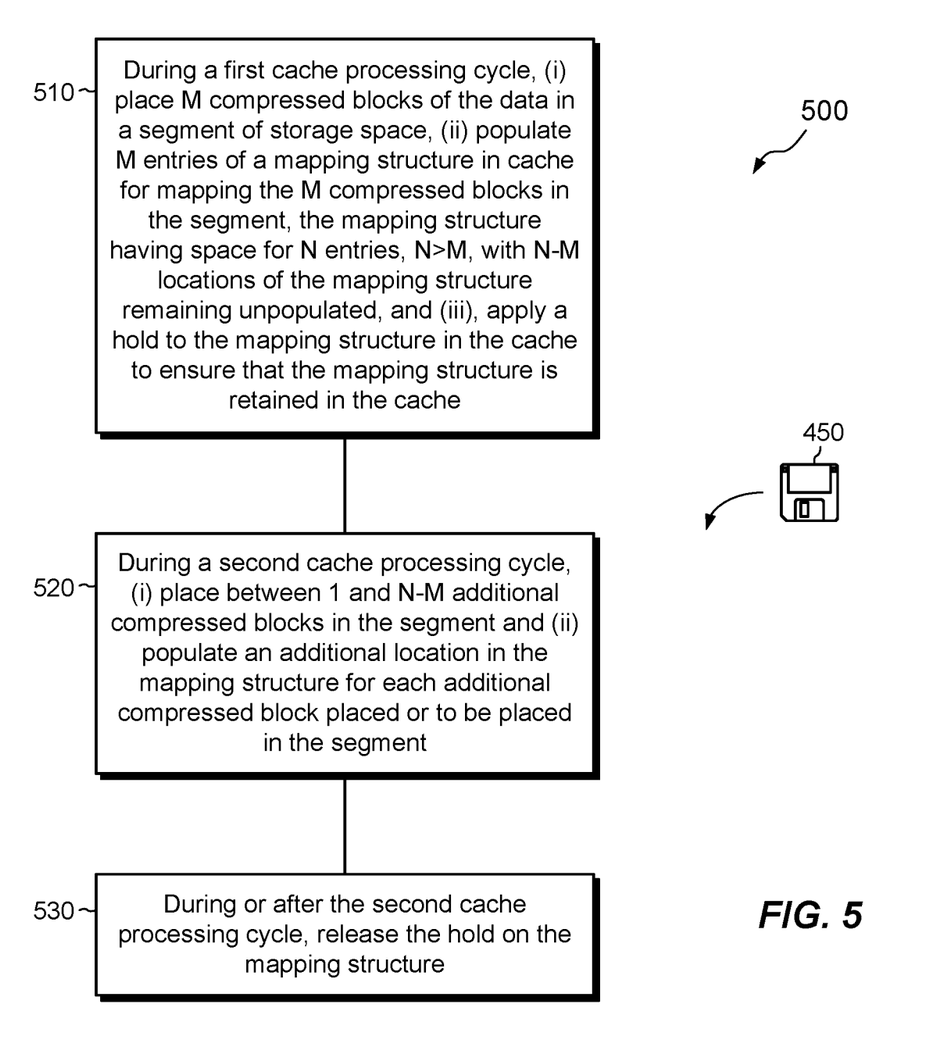

FIGS. 4 and 5 show example methods 400 and 500 that may be carried out in connection with the environment 100. The methods 400 and 500 are typically performed, for example, by the software constructs described in connection with FIG. 1, which reside in the memory 130 of the storage processor 120 and are run by the set of processors 124. The various acts of methods 400 and 500 may be ordered in any suitable way. Accordingly, embodiments may be constructed in which acts are performed in orders different from those illustrated, which may include performing some acts simultaneously.

As depicted in FIG. 4, method 400 shows an example processing arrangement for write requests in the data storage system 116. The method 400 may be carried out by a single thread or by any number of cooperating threads. At 410, the data storage system 116 receives I/O requests 112W specifying writes of specified data to identified locations. For example, each write 112W may be directed to a particular offset of a specified LUN, to a particular offset into a file in a specified file system, or to some other location. Writes 112W include overwrites and/or allocating writes, and data specified by writes 112W may be stored temporarily in data log 140.

At 412, the data log 140 arranges data from writes 112W in blocks 142, and arranges blocks 142 in batches 144, with each batch 144 including N blocks. N may equal twelve, for example.

At 414, various acts are repeated for each cache processing cycle 210, with each cycle 210 processing a respective batch 144.

At 420, compressor 146 obtains a new batch 144 from the data log 140 and compresses each block 142 in the new batch, thereby producing compressed blocks 152.

At 422, SP 120 attempts to overwrite in place any compressed blocks being overwritten, and, if overwrites in place fail, attempts to place compressed blocks 152 for any overwrites in existing holes. These holes may be indexed by mapping structures 160 that are already present in cache and thus can be easily accessed. If any mapping structures 160 are adequately filled at this stage, their indicators 154 may be reset, allowing the mapping structures 160 to be overwritten or flushed. After attempting overwrites in place and/or hole-fills for any overwrites, the SP 120 gathers the remaining compressed blocks from the current batch 144. The remaining compressed blocks number M, where M is less than N.

At 424, SP 120 calculates the collective size of these M compressed blocks. SP 120 may also predict the size of N−M compressed blocks which may be expected later. In some examples, the predicted size is estimated on the high side, e.g., by rounding up to the next physical block.

At 426, SP 120 allocates a new mapping structure 160 for mapping the M compressed blocks. SP 120 also allocates a new segment 170, which is provided with a size that is large enough to accommodate the collective size of the M compressed blocks plus a margin, where the margin equals the predicted size of the N−M compressed blocks, expected later.

At 430, the SP 120 determines whether the new mapping structure (MS) 160 is adequately full, e.g., whether its utilization exceeds a predetermined threshold. If so, operation proceeds to 432, whereupon the SP 120 flushes the new mapping structure 160 and segment 170 at the end of the current cycle 210. If any other mapping structures 160 were adequately filled (e.g., by hole-fill operations during the current cycle), those mapping structures 160 may also be flushed.

If, however, the SP 120 determines that the new mapping structure 160 is not adequately full, then operation proceeds instead to 434, whereupon the SP 120 places a hold on the new mapping structure 160 (by setting indicator 164), thereby preventing the new mapping structure 160 from being overwritten or flushed at the end of the current cycle 210.

With both outcomes of the determination at 430, operation eventually returns to 414, whereupon a next cache processing cycle 210 begins and a new batch 144 is obtained and processed.

Turning now to FIG. 5, the example method 500 summarizes some of the features described hereinabove.

At 510, during a first cache processing cycle 210-1, SP 120 (i) places M compressed blocks 152 of the data in a segment 170 of storage space, (ii) populates M entries 162a of a mapping structure 160 in cache for mapping the M compressed blocks in the segment 170, and (iii), applies a hold 164 to the mapping structure 160 in the cache 150 to ensure that the mapping structure 160 is retained in the cache 150. The mapping structure 160 has space for N entries, N>M, with N−M locations 162b of the mapping structure 160 remaining unpopulated.

At 520, during a second cache processing cycle 210-2, SP 120 (i) places between 1 and N−M additional compressed blocks 152 in the segment 150 and (ii) populates an additional location in the mapping structure 160 for each additional compressed block 152 placed or to be placed in the segment 170. The locations 162 of the mapping structure 160 may be written before or after the compressed data are written to the segment 170.

At 530, during or after the second cache processing cycle 210-2, SP 120 releases the hold 164 on the mapping structure 160.

An improved technique has been described for managing data received into a cache 150. To process a current batch 144 of compressed blocks 152 during a current cache processing cycle 210-1, a storage system 116 obtains a new mapping structure 160 and a new segment 170 of contiguous storage space. If the system can place some of the current batch 144 of compressed blocks 152 into previously-allocated space, the system does so and partially populates the new mapping structure 160 with entries for mapping the compressed blocks 152 that were not placed. The system then asserts a hold 164 on the new mapping structure 160, so that the mapping structure 160 is retained in cache at the end of the current cache processing cycle 210-1, and more completely populates the new mapping structure 160 with entries 162 for other compressed blocks during a later cache processing cycle before releasing the hold.

Having described certain embodiments, numerous alternative embodiments or variations can be made. For example, although the mapping structures and segments have been described herein in connection with a Linux-style file system, this is merely an example and should not be construed as limiting, given that the principles as described may be used with virtually any type of file system. Also, although embodiments have been described in the context of a data storage system, they may also be used in any computerized apparatus that receives and processes write requests. Processing may be distributed in any suitable manner, and some embodiments may be implemented with software-defined structures and/or in the cloud.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 450 in FIGS. 4 and 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing data received for writing, the method comprising:

during a first cache processing cycle, (i) placing M compressed blocks of the data in a segment of storage space, (ii) populating M entries of a mapping structure in cache for mapping the M compressed blocks in the segment, the mapping structure having space for N entries, N>M, with N-M locations of the mapping structure remaining unpopulated, and (iii), applying a hold to the mapping structure in the cache to ensure that the mapping structure is retained in the cache;

during a second cache processing cycle, (i) placing between 1 and N-M additional compressed blocks in the segment and (ii) populating an additional location in the mapping structure for each additional compressed block placed or to be placed in the segment; and during or after the second cache processing cycle, releasing the hold on the mapping structure.

2. The method of claim 1, wherein the M compressed blocks have a collective size in the segment, and wherein the method further comprises, during the first cache processing cycle and prior to placing the M compressed blocks in the segment, allocating the segment with a size that exceeds the collective size of the M compressed blocks by a margin, the margin based upon a predicted size of N-M additional compressed blocks.

3. The method of claim 2, further comprising predicting the size of the N-M additional compressed blocks based on (i) a block size of uncompressed blocks in the cache and (ii) a compression ratio achieved when compressing previously processed blocks.

4. The method of claim 2, wherein one or more of the M compressed blocks represent overwrites of data elements already stored, and wherein the method further comprises, for at least one of the M compressed blocks:

identifying a current storage location of the respective data element; and confirming that the compressed block does not fit in a space provided for the respective data element at the current storage location.

5. The method of claim 4, wherein, during the first cache processing cycle, the M compressed blocks belong to a batch of N compressed blocks, and wherein the method further comprises, for each of the N compressed blocks in the batch that is not one of the M compressed blocks, placing the compressed block in another segment that has available space for accommodating the compressed block.

6. The method of claim 4, wherein the cache operates repeatedly on successive cache processing cycles, and wherein during each cache processing cycle, the method includes (i) allocating a new segment for placing compressed blocks during that cache processing cycle and (ii) allocating a new mapping structure for mapping the compressed blocks in the respective new segment.

7. The method of claim 6, wherein allocating each new segment includes over-allocating space within the new segment when fewer than N compressed blocks are being placed in the new segment during the cache processing cycle.

8. The method of claim 6, further comprising running multiple computing threads that manage data in the cache, each of the computing threads configured to place holds on certain mapping structures, and wherein the method further comprises maintaining a hold list of mapping structures on which holds have been placed by the computing threads.

9. The method of claim 8, further comprising:

obtaining, by one of the computing threads, a new batch of N compressed blocks from the cache;

accessing the hold list;

identifying a mapping structure on the hold list that maps to a segment that has available space for storing one or more of the N compressed blocks, and placing said one or more of the N compressed blocks in the segment mapped by the identified mapping structure.

10. A computerized apparatus, comprising control circuitry that includes a set of processing units coupled to memory, the control circuitry constructed and arranged to:

during a first cache processing cycle, (i) place M compressed blocks of the data in a segment of storage space, (ii) populate M entries of a mapping structure in cache for mapping the M compressed blocks in the segment, the mapping structure having space for N entries, N>M, with N-M locations of the mapping structure remaining unpopulated, and (iii), apply a hold to the mapping structure in the cache to ensure that the mapping structure is retained in the cache;

during a second cache processing cycle, (i) place between 1 and N-M additional compressed blocks in the segment and (ii) populate an additional location in the mapping structure for each additional compressed block placed or to be placed in the segment; and during or after the second cache processing cycle, release the hold on the mapping structure.

11. The computerized apparatus of claim 10, wherein the M compressed blocks have a collective size in the segment, and wherein, during the first cache processing cycle and prior to placing the M compressed blocks in the segment, the control circuitry is further constructed and arranged to allocate the segment with a size that exceeds the collective size of the M compressed blocks by a margin, the margin based upon a predicted size of N-M additional compressed blocks.

12. A computer program product including a set of non-transitory, computer-readable media having instructions which, when executed by control circuitry of a computerized apparatus, cause the control circuitry to perform a method of managing data received for writing, the method comprising:

during a first cache processing cycle, (i) placing M compressed blocks of the data in a segment of storage space, (ii) populating M entries of a mapping structure in cache for mapping the M compressed blocks in the segment, the mapping structure having space for N entries, N>M, with N-M locations of the mapping structure remaining unpopulated, and (iii) applying a hold to the mapping structure in the cache to ensure that the mapping structure is retained in the cache;

during a second cache processing cycle, (i) placing between 1 and N-M additional compressed blocks in the segment and (ii) populating an additional location in the mapping structure for each additional compressed block placed or to be placed in the segment; and during or after the second cache processing cycle, releasing the hold on the mapping structure.

13. The computer program product of claim 12, wherein the M compressed blocks have a collective size in the segment, and wherein the method further comprises, during the first cache processing cycle and prior to placing the M compressed blocks in the segment, allocating the segment with a size that exceeds the collective size of the M compressed blocks by a margin, the margin based upon a predicted size of N-M additional compressed blocks.

14. The computer program product of claim 13, wherein the method further comprises predicting the size of the N-M additional compressed blocks based on (i) a block size of uncompressed blocks in the cache and (ii) a compression ratio achieved when compressing previously processed blocks.

15. The computer program product of claim 13, wherein one or more of the M compressed blocks represent overwrites of data elements already stored, and wherein the method further comprises, for at least one of the M compressed blocks:
identifying a current storage location of the respective data element; and
confirming that the compressed block does not fit in a space provided for the respective data element at the current storage location.

16. The computer program product of claim 15, wherein, during the first cache processing cycle, the M compressed blocks belong to a batch of N compressed blocks, and wherein the method further comprises, for each of the N compressed blocks in the batch that is not one of the M compressed blocks, placing the compressed block in another segment that has available space for accommodating the compressed block.

17. The computer program product of claim 15, wherein the cache operates repeatedly on successive cache processing cycles, and wherein during each cache processing cycle, the method includes (i) allocating a new segment for placing compressed blocks during that cache processing cycle and (ii) allocating a new mapping structure for mapping the compressed blocks in the respective new segment.

18. The computer program product of claim 17, wherein allocating each new segment includes over-allocating space within the new segment when fewer than N compressed blocks are being placed in the new segment during the cache processing cycle.

19. The computer program product of claim 17, further comprising running multiple computing threads that manage data in the cache, each of the computing threads configured to place holds on certain mapping structures, and wherein the method further comprises maintaining a hold list of mapping structures on which holds have been placed by the computing threads.

20. The computer program product of claim 19, wherein the method further comprises:
obtaining, by one of the computing threads, a new batch of N compressed blocks from the cache;
accessing the hold list;
identifying a mapping structure on the hold list that maps to a segment that has available space for storing one or more of the N compressed blocks, and
placing said one or more of the N compressed blocks in the segment mapped by the identified mapping structure.

* * * * *